United States Patent [19]

Otsuka et al.

[11] Patent Number: 5,895,521

[45] Date of Patent: Apr. 20, 1999

[54] DUST REMOVING APPARATUS AND DUST REMOVING METHOD

[75] Inventors: Kenji Otsuka; Hiroshi Waki; Yoshio Yamashita; Satoshi Arakawa; Toshiya Hatakeyama, all of Kanagawa, Japan

[73] Assignee: Japan Pionics Co., Ltd., Tokyo, Japan

[21] Appl. No.: 08/880,363

[22] Filed: Jun. 23, 1997

[30] Foreign Application Priority Data

Jun. 21, 1996 [JP] Japan ................. 8-181144

[51] Int. Cl.$^6$ ................................ B01D 46/04
[52] U.S. Cl. ................ 95/280; 55/302; 55/341.1
[58] Field of Search ................. 55/302, 341.1, 55/523; 95/279, 280

[56] References Cited

U.S. PATENT DOCUMENTS

| | | | |
|---|---|---|---|
| 3,457,787 | 7/1969 | Maatsch et al. | 95/279 X |
| 4,299,597 | 11/1981 | Oetiker et al. | 95/280 X |
| 4,331,459 | 5/1982 | Copley | 95/280 X |
| 4,507,130 | 3/1985 | Roth | 95/279 |
| 4,608,063 | 8/1986 | Kurokawa | 55/208 |
| 4,690,700 | 9/1987 | Howeth | 55/302 |
| 4,726,820 | 2/1988 | Stanelle | 55/302 X |
| 4,765,805 | 8/1988 | Wahl et al. | 55/341.1 X |
| 4,923,068 | 5/1990 | Crowson | 55/302 X |
| 5,110,331 | 5/1992 | Williams | 55/302 |
| 5,114,447 | 5/1992 | Davis | 55/523 X |
| 5,118,486 | 6/1992 | Burgie et al. | 95/280 X |
| 5,261,934 | 11/1993 | Shutic et al. | 95/280 |
| 5,269,835 | 12/1993 | Jensen | 55/302 X |
| 5,338,325 | 8/1994 | Stanelle | 55/302 X |
| 5,395,409 | 3/1995 | Klimczak et al. | 55/302 |
| 5,421,846 | 6/1995 | Klimczak | 95/280 X |
| 5,505,763 | 4/1996 | Reighard et al. | 95/280 X |
| 5,536,628 | 7/1996 | Awaji | 95/35 |

FOREIGN PATENT DOCUMENTS

| | | | |
|---|---|---|---|
| 0341451 | 11/1989 | European Pat. Off. . | |
| 1-106915 | 4/1989 | Japan | 95/279 |
| 4-118016 | 4/1992 | Japan | 95/280 |

OTHER PUBLICATIONS

Patent Abstracts of Japan, vol. 096, No. 011, Nov. 29, 1996 for JP 08 192019 A (Japan Pionics Co., Ltd.), Jul. 30, 1996.

Patent Abstracts of Japan, vol. 018, No. 575 (c–1268), Nov. 4, 1994 for JP 06 210133 A (Japan Pionics Co., Ltd.), Aug. 2, 1994.

*Primary Examiner*—Robert Spitzer
*Attorney, Agent, or Firm*—Sughrue, Mion, Zinn, Macpeak & Seas, PLLC

[57] ABSTRACT

A dust removing apparatus equipped with a back washing mechanism and a dust removing method for removing solid silica fine powder contained in a gas discharged from a semiconductor producing step of a single-wafer processing atmospheric pressure CVD apparatus without causing problems caused by the increase of a pressure loss and by a pressure fluctuation, wherein filter elements each having a ratio of a surface area of a primary side of a filter membrane to an apparent external surface area of the filter element of from 1 to 5 is used, gas jetting nozzle(s) for back washing is formed in the secondary side of the filter element, back washing is not carried out during filtration in the filter element and at or after changing the processing of a wafer in the CVD apparatus, back washing is carried out to blow down the silica fine powder accumulated on the primary side of the filter membrane.

6 Claims, 3 Drawing Sheets

DUST REMOVING APPARATUS AND DUST REMOVING METHOD

FIELD OF THE INVENTION

The present invention relates to a dust removing apparatus equipped with a back washing mechanism and a dust removing method, for removing fine powder contained in a gas discharged from a semiconductor production step using a single wafer processing atmospheric pressure CVD (Chemical Vapor Deposition) apparatus. More specifically, the present invention relates to a dust removing apparatus equipped with a back washing mechanism and a dust removing method, for efficiently removing fine powder attached and accumulated onto the surface of a filter membrane without adversely affecting a film-forming step on wafers, and restoring the surface of the filter membrane to the initial state to regenerate the filter membrane.

BACKGROUND OF THE INVENTION

In the recently quickly developed semiconductor production industry, various kinds of gases are used. Of these gases, large amounts of silane series gases such as silane, disilane, tetraethoxysilane, dichlorosilane, or trichlorosilane are used as typical gases.

These gases are usually used in diluted states. However, since these gases are active gases which are combustible and have toxicity, it is necessary for exhaust gases after being used in a semiconductor production step, etc., to be subjected to a cleaning treatment. Also, because some of the gases discharged from a semiconductor production process contain a large amount of silica fine powder which is a decomposition product in the process, in addition to the silane series gases, the removal of the silica which is fine powder must be considered in performing exhaust gas treatment.

The cleaning treatment of silane series gases includes a wet-type cleaning method utilizing a hydrolysis reaction, a dry-type cleaning method utilizing a dehydrogenation reaction, and a combustion-type cleaning method utilizing an oxidation reaction. However, in these methods, the silica which is fine powder contained in the exhaust gas becomes a factor causing various problems.

That is, the wet-type cleaning method involves the problem that the pipes are clogged and a large amount of a slurry is formed, which will require much time to maintain the equipment. Also, the dry-type cleaning method involves the problem that the surface of a cleaning agent is covered with silica, and as a result, the cleaning capacity is decreased and cannot exhibit the sufficient capacity. Furthermore, the combustion-type cleaning method involves the problem that a combustion burner is clogged with the silica fine powder.

Accordingly, it has been desired to efficiently remove the silica fine powder existing in the exhaust gas in a large amount prior to the cleaning treatment of the exhaust gas.

A filtration method is generally used as a method of removing relatively fine powder contained in large amount in an air current. However, the filtration method has the disadvantage that pressure loss at the filter membrane is gradually increased with the passage of filtration and finally it becomes impossible to carry out the filtration. The pressure loss is usually proportional to the thickness of a layer of fine powder accumulated on the surface of the filter membrane. Accordingly, to maintain less pressure loss, the larger the area of the filter membrane, the better. However, to obtain a large filtration area with a flat filter membrane involves the disadvantage that the apparatus becomes large. A technique of pleating the filter membrane is known as a method for avoiding large-sizing of the filter and at the same time increasing the area of the filter membrane. For example, a pleated filter membrane wherein the value obtained by dividing the area of the filter membrane by the external surface area of the filter element is 10 or more is generally used.

However, even in such a filter element having an increased area of the filter membrane, the pressure loss of the filtration film is increased by fine powder accumulated on the surface of the filter membrane with the progress of the filtration, and finally it becomes impossible to continue the filtration. Accordingly, it is necessary to clean or exchange the filter element.

The maintenance of such a filter is troublesome, and various mechanisms of automatically cleaning and regenerating the filter are proposed. For example, a method of shaking down fine powder by applying an oscillation or an impact to the surface of the filter membrane, a method of automatically shaking down fine powder by a brush, scraper, etc., and a back wash method (pulse jet system) of disposing a Venturi tube in the inside of a filter element such as a bag filter, and blowing down fine powder by intermittently jetting a compressed gas from the Venturi tube are known.

In these regenerating methods of a filter membrane, the method of applying an oscillation or an impact to the surface of the filter membrane is an effective method for the filtration of a dried powder having a large bulk density, such as an ore powder, but is not effective for the filtration of a powder having the properties that the specific gravity is small, the bulk density is small, and bridges tend to form among the powder particles, such as the powder contained in an exhaust gas discharged from a semiconductor production step. In particular, in the case of silica formed by the decomposition of tetraethoxysilane contained in the exhaust gas from a semiconductor production step, the fine powder of the silica is fine and have a very strong attaching property, and hence a sufficient effect is not obtained by the method.

The method of scraping down attached fine powder by a brush, a scraper, etc., is also conventional. However, this method involves problems that the structure of the apparatus becomes complicated, and when the fine powder is fine and has a strong attaching property such as silica as described above, it is difficult to completely scrape down and also the filter membrane is injured.

The back wash method of releasing the attached fine powder by jetting a compressed gas from the inside of the filter element is widely used. However, this method has the problem that where the filter element is a filter membrane having complicated pleated form, it is difficult to sweep away the accumulated fine powder at the portion where the filter membrane is adjacent to each other with a narrow space, such as the folded portion, etc., of the pleat.

On the other hand, when the form of the filter element is a relatively simple bag filter, the fine powder accumulated on the filter membrane can be blown off by a back wash method of intermittently jetting a compressed gas every few minutes while performing the filtration. However, even in this method, when the cycle of the back wash is long, the accumulated fine powder is compressed to increase the attaching property, which decreases the blowing off effect.

In particular, in a single wafer processing CVD apparatus wherein a large number of wafers are inserted in a processing apparatus and continuously processed in the apparatus, the processing time per one batch is very long and an allowable value of the pressure fluctuation in the apparatus is very small. Therefore, a continuous filtration of a long time is required. Further, the back wash method of jetting a compressed gas while performing a filtration has a disadvantage of causing a pressure fluctuation, and for this reason, the back wash method cannot be employed. Thus, when the cycle of the back wash is prolonged and the back wash is carried out in a batch unit of wafer feeding, there is a problem that fine powder forms bridges and thus the fine powder cannot be sufficiently blown down. In particular, because the silica formed by the decomposition of tetraethoxysilane is the fine powder fundamentally having a very strong attaching property, there is a problem that when the cycle of the back wash is prolonged, the effect of blowing down the fine powder is not obtained.

Thus, it has been desired to develop a dust removing apparatus and a dust removing method capable of removing with a high efficiency the fine powder having a high attaching property discharged from CVD semiconductor production apparatus without adversely affecting the CVD semiconductor production apparatus system.

SUMMARY OF THE INVENTION

As a result of various investigations, under these circumstances, for obtaining a filter equipped with a back washing mechanism capable of efficiently removing fine powder contained in an off gas discharged from a semiconductor production step using a single wafer processing atmospheric pressure CVD apparatus and, at the same time, efficiently blowing down the fine powder attached and accumulated onto a filter membrane to restore the surface of the filter membrane to the initial state without adversely affecting the film-forming step on a wafer, it has been found that the fine powder can be efficiently removed by using a filter element wherein the ratio of the surface area of the filter membrane at the primary side to the apparent external surface area of the filter element is from 1 to 5 and which is equipped with a gas jetting mechanism inside the filter for back washing, not carrying out back washing during wafer processing, and carrying out back washing under a specific jetting condition after wafer processing. The present invention has been attained based on this finding.

One embodiment of the present invention is to provide a dust removing apparatus for removing fine powder contained in an exhaust gas discharged from a semiconductor production step using a single wafer processing atmospheric pressure CVD apparatus, comprising a filter equipped with a filter element and a pulse jet nozzle of a gas for back washing disposed at the secondary side of the filter element, a gas suction blower, and a pulse tank connected to the gas jet nozzle, wherein a ratio ($S_2/S_1$) of a surface area ($S_2$) at the primary side of a filter membrane to an apparent external surface area ($S_1$) of the filter element is from 1 to 5, and a gas jetting amount for back washing is such that a value of a volume of gas per one pulse divided by a jetting time and an area of the filter membrane of the portion to be jetted is from 0.03 to 0.3 $m^3/m^2 sec$.

Another embodiment of the present invention is to provide a dust removing method for removing fine powder contained in an exhaust gas discharged from a semiconductor production step using a single wafer processing atmospheric pressure CVD apparatus, which comprises continuously carrying out a filtration using a filter equipped with a filter element, wherein a ratio ($S_2/S_1$) of a surface area ($S_2$) at a primary side of a filter membrane to an apparent external surface area ($S_1$) of the filter element is from 1 to 5, and which filter is also equipped with a pulse jet mechanism of a gas for back washing disposed in an air chamber at a secondary side of the filter element, without carrying out back washing until processing of a wafer fed in the CVD apparatus is completed, and carrying out back washing after completion of the processing of the wafer, wherein a jetting amount of the gas for the back washing is such that a value of a volume of gas per one pulse divided by a jetting time and an area of the filter membrane at the portion to be jetted is from 0.03 to 0.3 $m^3/m^2 \cdot sec$.

DETAILED DESCRIPTION OF THE INVENTION

The present invention is described in detail below.

The present invention is applied for removing fine powder contained in an exhaust gas discharged from a semiconductor production step using a single wafer processing atmospheric pressure CVD apparatus.

In particular, the present invention is applied for filtering various kinds of gases containing, together with toxic gases, fine powder that is relatively difficult to be blown off when it is accumulated on the filter membrane. For example, the present invention can remove dusts from an exhaust gas containing silica as fine powder together with a silane series gas such as silane, disilane, tetraethoxysilane, dichlorosilane, or trichlorosilane.

Further, in the present invention, by forming two or more lines of filters in parallel to one wafer processing apparatus via change-over valves, fine powder in the exhaust gas can be efficiently removed while completely preventing adverse influences onto the atmospheric pressure CVD apparatus side caused by the pressure fluctuation in back washing, by jetting in, pulse-like, a gas for back washing to the secondary side of the filter element while performing the filtration in any other line, and discharging the waste gas to another line, or releasing the waste gas to the down-stream side of the line which is used for filtration, or releasing the waste gas to the system of using in filtration via a gas throttle valve mechanism.

The present invention is then specifically explained by referring to the accompanying drawings.

Figure 1:
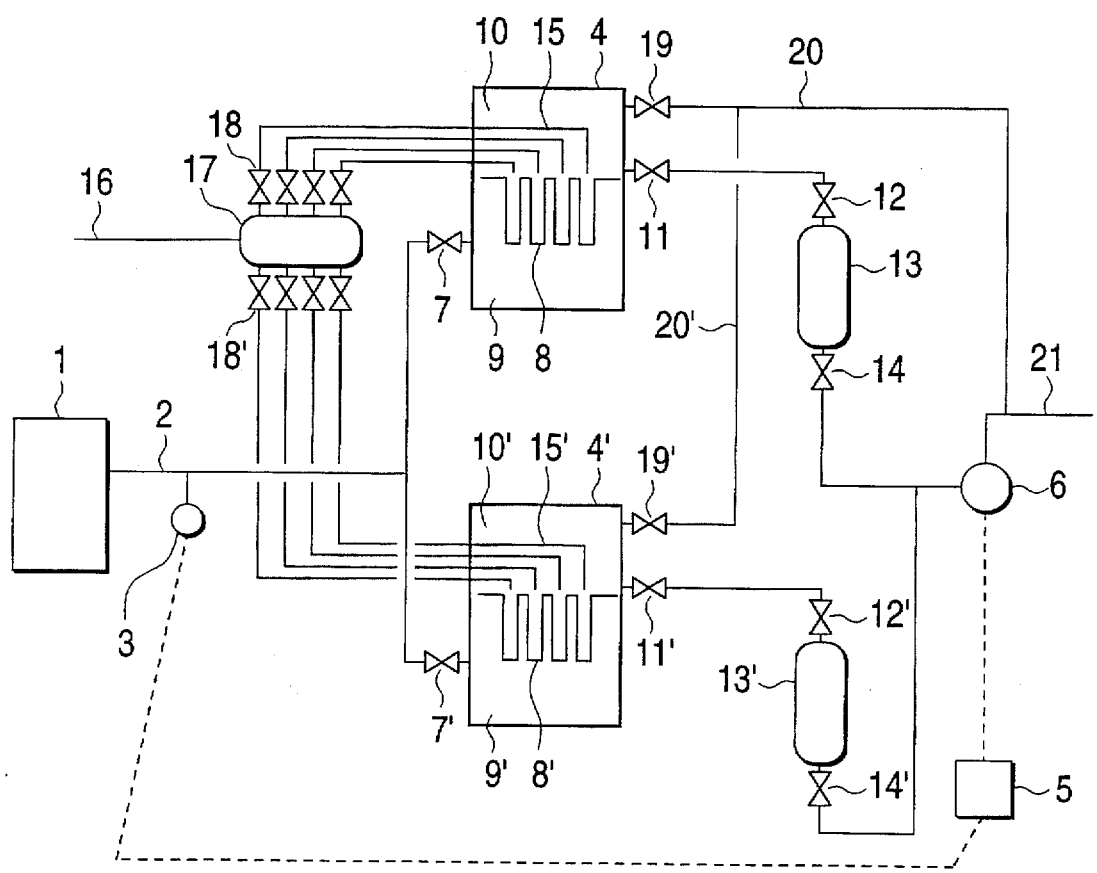
FIG. 1 is a schematic view showing an example of the dust removing apparatus of the present invention.
Figure 2:
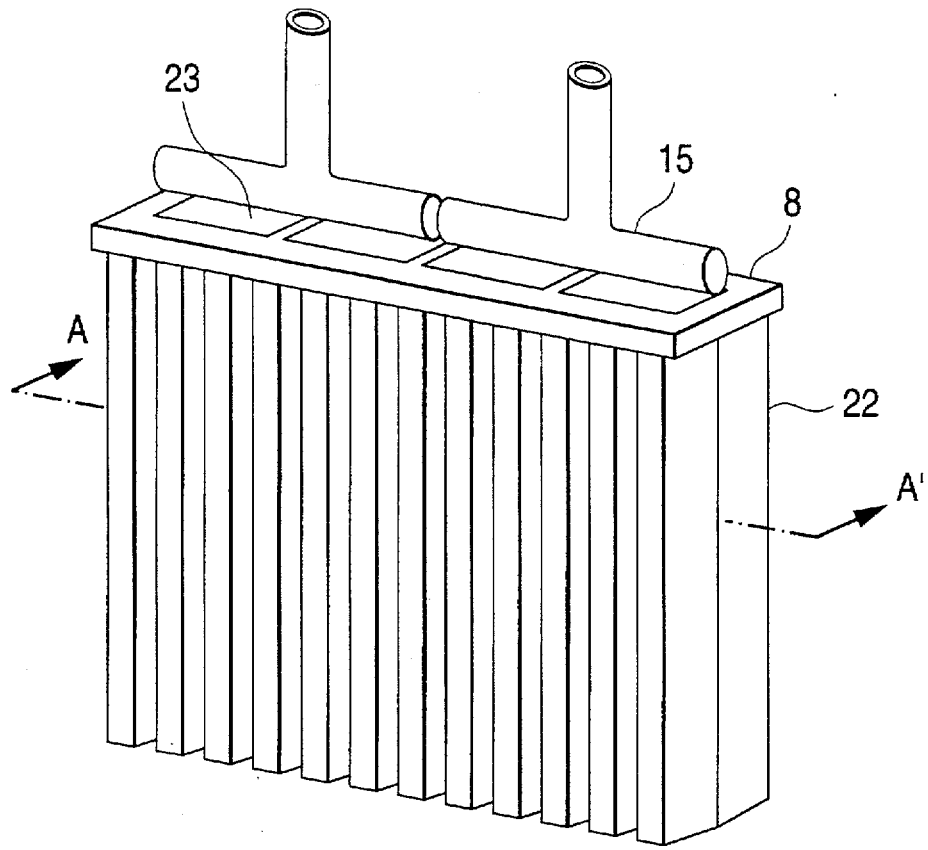
FIG. 2 is a slant view showing examples of the filter element and the jet nozzle used in the present invention.
Figure 3:
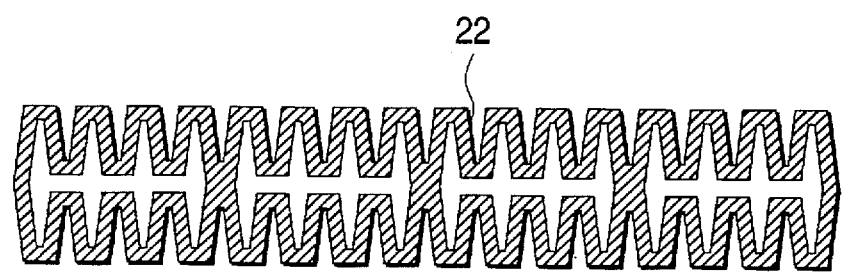
FIG. 3 is a cross-sectional view taken along the line A-A' in FIG. 2.
Figure 4:
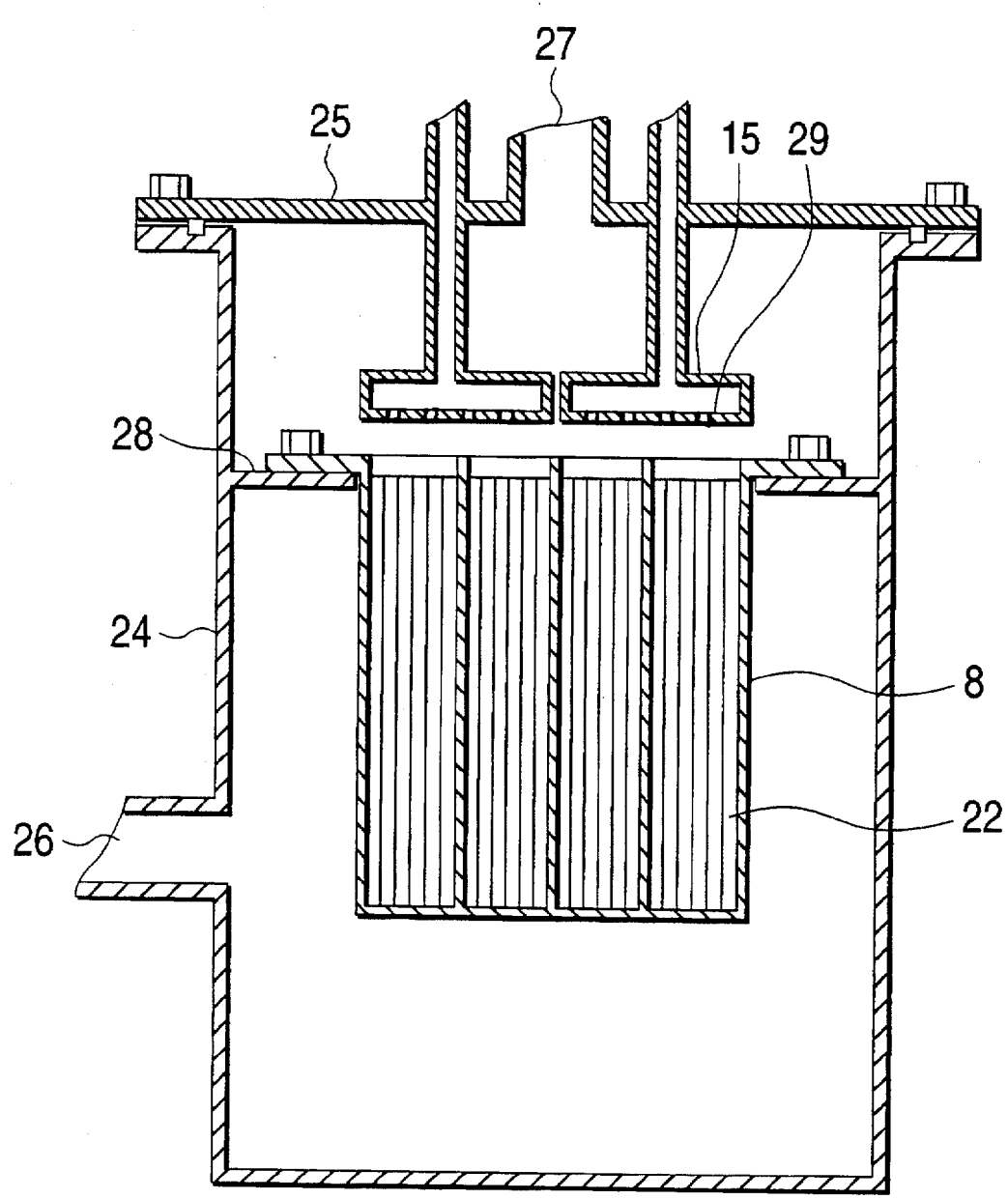
FIG. 4 is a schematic cross-sectional view showing an example of the filter used in the present invention.

FIG. 1 is a schematic view showing an example of the dust removing apparatus of the present invention. FIG. 2 is a slant view showing example of the filter element and the jet nozzle used in the present invention. FIG. 3 is a cross-sectional view taken along the line A-A' of FIG. 2. FIG. 4 is a schematic cross-sectional view showing an example of the filter used in the present invention.

FIG. 1 is an example of the dust removing apparatus of the present invention having two filters, systems for supplying compressed gas for back washing and a gas discharging line each connected to each of the filters, an inflow line for a gas containing fine powder to be treated, a discharging line for the treated gas, and two lines of filters in parallel per one single wafer processsing atmospheric pressure CVD processing apparatus.

In FIG. 1, a single wafer processing atmospheric pressure CVD apparatus 1 is connected to filters 4 and 4' via an exhaust gas pipe 2 and change-over valves 7 and 7'. In the filters 4 and 4' are disposed filter elements 8 and 8', respectively. The filter elements 8 and 8' are connected from the secondary sides 10 and 10' to cleaning columns 13 and 13', respectively, via change-over valves 11 and 11' and inlet change-over valves 12 and 12', respectively. In each of the cleaning columns 13 and 13' is filled a cleaning agent capable of treating silane series gases contained in the exhaust gas, and the cleaning columns 13 and 13' are connected to a blower 6 via outlet change-over valves 14 and 14', respectively. The exhaust gas pipe 2 has equipped thereto a pressure sensor 3 and by controlling the rotation number of the blower 6 via an inverter 5, the pressure at the pressure sensor 3 portion can be set up at a constant pressure or an optional pressure.

In the secondary sides 10 and 10' of the filter elements 8 and 8' are formed nozzles 15 and 15' for back washing, respectively, and these nozzles are connected to a head tank 17 and a gas supply pipe 16 via valve groups 18 and 18', respectively, and these nozzles can jet the gas in a pulse-like manner. The head tank 17 is formed for enabling quickly jetting a compressed gas.

The secondary sides 10 and 10' of the filter elements 8 and 8' are further connected to exhaust gas pipes 20 and 20', respectively, via valves 19 and 19'.

In the apparatus shown in FIG. 1, an example of an operation method of removing fine powder is explained.

Valves 7, 11, 12, and 14 are opened and all other valves are closed. The exhaust gas during wafer processing is flowed to only the filter 4 side through the exhaust gas pipe 2 and fine powder such as silica in the exhaust gas are caught by the filter element 8. The gas from which fine powder was removed is introduced into the cleaning column 13 and toxic gases such as silane series gases are removed. The gas treated in the cleaning column 13 enters the blower 6 via the change-over valve 14 and is discharged to the outdoors through an exhaust gas duct 21 connected to the blower.

During processing wafer, the pressure lost at the filter element 8 is increased with an increasing amount of fine powder caught by the filter element 8. However, the pressure in the portion equipped with the pressure sensor 3 is maintained at a constant pressure by controlling the rotation number of the blower 6 via the inverter 5 based on the signal of the pressure sensor 3. Also, the change-over of the filter for preventing the pressure fluctuation in the treatment apparatus is not performed until processing in the batch unit of the wafer fed in the CVD apparatus 1 is completed. Further, for the same reason, back washing in the filter element 8 is not performed.

After the batch processing of the wafer is completed and before next processing of a wafer is carried out, the passage of gas is changed to the filter 4' side. That is, the valves 7, 11, 12, and 14 are closed, the valves 7', 11', 12', and 14' are opened, and in the next processing of a wafer, the removal of fine powder and the removal of toxic gases are carried out in the side having filter 4' and cleaning column 13'. During this processing of the wafer, the change-over of the filter is not performed and back washing in the filter element 8' is not performed for the same reason as described above.

On the other hand, during the above treatment, in the filter 4, the valve 19 is opened and the compressed gas stored in the head tank 17 is jetted in pulse like from the back washing nozzles 15 via the valve group 18 to blow down the fine powder accumulated on the primary side of the filter element 8 from the filter membrane. Also, the gas used for back washing is discharged to the downstream of the blower 6 or to the exhaust gas duct 21 through the exhaust gas pipe 20.

In FIGS. 2 to 4, 22 is a filter membrane. 23 is an upper opening of the filter element, 24 is a filter body, 25 is an upper flange of the filter, 26 is a gas inlet of the filter, 27 is a gas outlet of the filter, 28 is an inner flange portion for holding the filter element, and 29 is a jet nozzle hole.

There is no particular limitation on the material of the filter element if the material can endure the impact by the pulse gas for back washing, and the material can be appropriately selected from generally commercially available materials for filter elements for removing fine powder, such as filter cloths made of synthetic fibers, natural fibers, or metal fibers; synthetic resin powder sintered filter materials, ceramic filter materials, or metal sintered filter materials.

The form of the filter element is optional, such as a tabular form, a box form, or a cylindrical form. However, it is difficult to obtain the effect of back washing in a complicated form such as a pleated filter membrane, and wherein a pleated filter membrane is folded at an obtuse angle. In general, a simple form capable of being easily back washed and regenerated is preferred.

The filter element usually used for this purpose is a filter element wherein the ratio ($S_2/S_1$) of the surface area ($S_2$) at the primary side of the filter membrane to the apparent external surface area ($S_1$) of the filter element is from 1 to 5. Although a filter element wherein the ratio ($S_2/S_1$) is less than 1 does not theoretically exist, when the ratio is near 1, the area of the filter membrane is small for the volume size of the filter element. Therefore, such a filter element is disadvantageous in that the pressure loss is increased. Also, when the ratio ($S_2/S_1$) is large, the form of the filter element becomes complicated or the space between the adjacent filter membranes becomes narrow, and as a result, the back washing effect is not obtained. Thus, the filter element wherein the ratio is from 1.5 to 3 is preferably used.

The term "the apparent external surface area ($S_1$) of the filter element" used herein means the external surface area of the filtering portion based on the external form of the filter element. For example, when the filter element is a box form, the apparent external surface area means the total surface area of the filtering portion calculated from the length, the width, and the height of the external form. Also, when the filter element is formed into a cylindrical form by pleating the filter membrane, the apparent external surface area means the surface area of the filtering portion of the cylinder.

The term "the surface area ($S_2$) at the primary side of the filter membrane" used herein means the geometrical surface area of the filter membrane. For example, when the filter membrane is a cloth or a net, the surface area at the primary side of the filter membrane is the externally observed surface area of the membrane and does not include the surface areas in the fine pores of the filter membrane. In the case of, for example, a pleated filter membrane, the surface area at the primary side of the filter membrane is the area at the primary side of the pleated portions.

In the pulse jet mechanism of a gas for back washing, the jet nozzles are formed in the air chamber at the secondary side of the filter element. There is no particular limitation on the form of the orifice of the jet nozzle if the nozzle can uniformly supply a gas in the whole jetting range. When perpendicularly jetting to the filtering surface, it is necessary to form many jet orifices for uniformly distributing a gas to the entire surface. For this reason, a method of jetting a gas parallel to the filtering surface is generally used to decrease the number of the jet orifices.

The time capable of continuously carrying out the filtration depends upon the property and the concentration of fine powder, the flow rate of the gas to be treated, or the like, and thus cannot be determined definitely. However, since the fine powder is compressed further increasing the attaching force of the fine powder as the thickness of the layer of the accumulated fine powder increases, it is preferred to carry out back washing before the thickness of the layer of the accumulated fine powder increases too much. In general, it is preferred to carry out back washing when the thickness of the layer of the accumulated fine powder is 10 mm or less.

The gas to be treated contains toxic silane series gases in addition to silica fine powder. Therefore, a cylinder or an apparatus for removing these toxic gases can be connected to the outlet side of the filter for treating these toxic in the filtered gas. The method of removing toxic gases includes a dry method and a wet method, but there is no particular limitation on the method used in the present invention.

When the jetting time of the pulse gas for back washing is too short, the amount of gas sufficient for giving impact to the accumulated fine powder is not jetted, so that a back washing effect is not obtained. On the other hand, when the jetting time is too long, it is difficult to obtain a back washing effect more than was obtained at the beginning of jetting. Therefore, the jetting time is usually from 0.05 to 2 seconds, and preferably from 0.1 to 0.3 second.

When the amount of the pulse jetting gas is too small, the back washing effect is not obtained, whereas when the amount is too large, the filter membrane is deformed. Therefore, the value of the volume of gas per one pulse divided by the jetting time and the area of the filter membrane to be jetted is preferably from 0.07 to 0.2 $m^3/m^2 \cdot sec$. The form of the filter element is not particularly limited with respect to the structure thereof if the amount of the pulse jetted gas can fall within the range of from 0.03 to 0.3 $m^3/m^2 \cdot$second. Usually, pulse jetting of the compressed gas at a pressure of from 2 to 10 $kg/cm^2G$ in the head tank is carried out by opening the valve for from 0.05 to 2 seconds, and preferably from 0.1 to 0.5 second, via an electromagnetic valve.

In addition, it is preferred that pulse-like gas jetting from each jet nozzle of the filter is carried out with a time difference in order to minimize the pressure increase in the whole secondary side of the filter.

A method of exhausting the gas introduced by pulse jetting in the present invention is that the gas is exhausted to the downstream of the blower or to the outside from the filter element through the exhaust gas pipe. Another method is that by interposing a throttle valve in the exhaust gas pipe, the gas can be exhausted to the downstream portion of the filter in the side performing the filtration.

The present invention is mainly applied to the filtration of a gas containing silica fine powder, but can be applied to the filtration of a gas containing an aluminum oxide powder, a zinc oxide powder, etc.

The present invention is described in more detail by reference to the following examples, but it should be understood that the invention is not construed as being limited thereto.

EXAMPLE 1

The dust removing apparatus as shown in FIG. 1 was used. Each filter element was a box type element having, as the external form dimensions, a width of 224 mm, a height of 500 mm, and the depth of 40 mm, and made up of a sintered polyester resin. The filter element was formed by facing two pleated filter membranes each having a pleat of one pleat width of 14 mm and 16 folds in a sawtooth form, the pleat having convex portions each having a width of 5 mm and concave portions each having a depth of 11.6 mm and a width of 5 mm with the height direction as the axis. The filter element is partitioned into 4 air chambers each containing 4 pleated filter membranes. The external surface area ($S_1$) of the filter element was 0.28 $m^2$ and the surface area ($S_2$) at the primary side of the filtration film was about 0.60 $m^2$. Accordingly, the ratio ($S_2/S_1$) of the surface area at the primary side of the filtration film to the external surface area of the filter element was 2.1.

A filter having the filter membrane area of about 2.4 $m^2$ was formed using the 4 filter elements above. In the secondary side of each filter element were formed 2 jet nozzles for back washing per one filter element. Each jet nozzle was formed by closing both ends of a pipe of 20A (the outside diameter was 27.2 mm and the inside diameter was 23 mm), 2 jet orifices each having a diameter of 6 mm were formed in the side of the pipe such that each jet orifice corresponded to each air chamber, and each jet nozzle was disposed such that each jet orifice was directed to the axis direction of each air chamber. Each jet nozzle was connected to a head tank having a volume of 6 liters via each pipe of 20A and each electromagnetic valve. The head tank was connected to a supply pipe of a nitrogen gas having a pressure of 6 $kg/cm^2G$. The exhaust gas line of the nitrogen gas for back washing in back washing was connected to the exhaust gas pipe at the downstream of the blower.

By disposing 2 filters in parallel as above, they could be used alternatively.

To the downstream of the filters were formed in parallel cleaning columns each filled with a cleaning agent for tetraethoxysilane, and the cleaning column used could be alternated. At the downstream of the cleaning columns was disposed a blower for gas exhausting. The blower was connected to a pressure sensor, a pressure indication controller, and an inverter such that they operated together and the rotation number of the blower was controlled such that the pressure at the equipped portion of the pressure sensor became a constant value of −100 mm $H_2O$.

The change-over valves for the filter and the cleaning column in the operating line were open, the corresponding change-over valves of the non-operating line were closed, and in both lines, the valve groups for back washing and the exhaust gas valves for the back washing gas were closed.

The treatment of a gas containing silica fine powder discharged from an atmospheric pressure CVD apparatus using tetraethoxysilane was then conducted. During a film-formation step over a total of 50 hours of processing wafers by plural batches in the atmospheric pressure CVD apparatus, the exhaust gas was continuously filtered by the filter without carrying out back washing of the filter membranes. In the subsequent maintenance time of the CVD apparatus, the line-of the filters was changed, and during the further film-formation step over a total of 50 hours, the processed gas was continuously filtered without conducting back washing.

On the other hand, in the filter which previously completed the filtration, while maintaining the closed state of the change-over valve, the jetting valves of a gas for back washing were successively opened for 0.2 second with a one minute interval to conduct back washing while the exhaust gas valve of the jetted gas was opened. When the jetted amount of the gas for back washing and regeneration was obtained from the product of the amount of the pressure decrease in the head tank and the volume of the head tank, the amount was about 4 liters per one jet orifice. That is, back washing was conducted at the value of the volume of gas per one pulse divided by the jetting time and the filter area to be jetted of 0.13 $m^3/m^2 \cdot sec$. The line of the conducted back washing waited for until other line completed the filtration and changed to the next line.

By repeating the line of the operation, the filtration back washing were conducted 5 times each in each filtrating line. During the operation, the pressure difference before and behind the filter was about 40 mm $H_2O$ at the initiation of the filtration and was about 550 mm $H_2O$ after completion of the filtration, which were constant, and the increase of the pressure loss was not observed. When the inside of each of the filters was inspected after completion of the back washing, the filter membrane of the filter element was completely exposed and the excellent back washing effect was confirmed.

EXAMPLE 2

After conducting the same filtration as in Example 1 using the same apparatus shown in Example 1, four filter elements having attached thereto silica fine powder were taken out. To one filter element of the four filter elements was applied the same back washing and regeneration test as in Example 1 except that both ends of a pipe of 15A (the outside diameter was 21.7 mm and the inside diameter was 17.5 mm) were closed, 4 jet orifices each having a diameter of 4 mm were formed on the side of the pipe, and a primary side was in a state of open air. When the jetted amount of the back washing gas per one pulse in back washing was obtained from the product of the amount of the pressure decrease in the head tank and the volume of the head tank, the amount was about 1.6 liters per one jet orifice. That is, the value of volume per one pulse divided by the jetting time and the filtration area to be jetted was 0.05 $m^3/m^2$·sec. When the inside of the filter was inspected, a residue of the fine powder was partially observed but the filter membrane of the filter element was almost exposed.

EXAMPLE 3

A commercially available filter was dismantled, the pleat-form filter membranes were reduced to set up a filter element, and a filter element made up of a cylinder having an outside diameter of 200 mm and a height of 400 mm, having a cylindrical space having a diameter of 90 mm at the central portion, and having formed in the cylindrical space and the space between the outside diameters pleated filter membranes was prepared. The external surface area of the filter element was 0.251 $m^2$, the area of the filter membrane was 0.88 $m^2$, and the ratio ($S_2/S_1$) of the surface area at the primary side to the apparent external surface area of the filter element was 3.5. The cylindrical inside wall of the filter element was used as the secondary side surface and a jet nozzle for back washing was formed there.

The jet nozzle was made up of a pipe of 20A (the outside diameter was 27.2 mm and the inside diameter was 23 mm) having an open end (jet orifice) and the jet nozzle was disposed such that the jet orifice was directed to the axial direction of the cylinder. The jet nozzle was connected to a head tank having an inside volume of 6 liters via a pipe of 20A and an electromagnetic valve. The head tank was connected to a supply pipe of a nitrogen gas having a pressure of 6 kg/$cm^2$G.

By forming two filters in parallel each containing the above two filter elements, they could be used alternatively. After the construction, the removal of dusts was conducted in the same manner as in Example 1.

In addition, the gas jetting nozzles for back washing were successively opened with an interval of 0.5 minutes for 0.2 second each to conduct back washing. In this case, when the jetted amount of the back washing and regenerating gas per one pulse was obtained from the product of the amount of the pressure decrease in the head tank and the volume of the head tank, the amount was about 15 liter per one jet orifice. This means that back washing was conducted at the value of volume of gas per one pulse divided by the jetting time and the filtration area to be jetted of 0.085 $m^3/m^2$·sec. When the inside of the filter was inspected after back washing, blowing down of particles was poor and a residue of the fine powder was partially observed. However, the filter element was somehow in a repeatedly usable state.

COMPARATIVE EXAMPLE 1

To the secondary side of the same type of the filter as used in Example 1 was formed one back washing and regenerating jet nozzle per one filter element. Filtration test was carried out in the same manner as in Example 1 except that the jet nozzle was made up of a pipe of 15A (the outside diameter was 21.7 mm and the inside diameter was 17.5 mm), both ends of which being closed, having formed four jet orifices each having a diameter of 4 mm on the side thereof, the jet nozzle was disposed such that one jet orifice corresponded to each one of the four air chambers such that a gas was jetted in parallel with the surface of the filter membrane of the filter element, and each jet nozzle was connected to head tank having an inside volume of 1.4 liters via a pipe of 8A (the outside diameter was 13.8 mm and the inside diameter was 10.5 mm) and an electromagnetic valve. When the jetted-amount of the gas for back washing per one pulse in back washing was obtained from the amount of pressure decrease in the head tank and the volume of the tank, the amount was 0.42 liter per one jet orifice. That is, back washing was conducted at a value of volume of gas per one pulse divided by the jetting time and the filtration area to be jetted of 0.014 $m^3/m^2$·sec.

In each filtration line, a first filtration could be conducted well, such that the pressure difference was about 40 mm $H_2O$ at the initiation of the filtration and was about 550 mm $H_2O$ at completion of the filtration as the same as in Example 1. Also, in a second filtration, the pressure difference was about 40 mm $H_2O$, which was the same as that of the first filtration, at the initiation of the filtration, but was about 850 mm $H_2O$ at completion of the filtration. In a third filtration, the pressure difference was about 40 mm $H_2O$, which was not changed, at the initiation of the filtration, but during the filtration, the pressure loss at the filter portion became large and it became impossible to maintain the pressure at the equipped portion of the pressure sensor at −100 mm $H_2O$. As a result, the filtration was stopped. At the time, back washing was conducted. As a result of inspecting the inside of the filter, it was confirmed that the blowing down of the silica fine powder was insufficient and the filter membrane was completely covered with the silica fine powder.

COMPARATIVE EXAMPLE 2

A series of operations was initiated in the same manner as in Example 1 except that the exhaust gas line of the jetted nitrogen gas at back washing was connected between the change-over valve at the outlet side of the filter in the line carrying out the filtration and the change-over valve at the inlet side of the cleaning column. As a result, when back washing and regeneration were conducted, the pressure at the equipped portion of the pressure sensor was fluctuated, whereby the film formation in the CVD apparatus had to be stopped.

COMPARATIVE EXAMPLE 3

Using pleated cylindrical filter membranes each made of polyester having a filtration area of 2.5 $m^2$ and having an outside diameter of 200 mm, an inside diameter of 90 mm, and the length of 400 mm was used as filter elements, 2 lines of filters without having a back washing mechanism were assembled to obtain an apparatus having the same construction as in Example 1. The ratio ($S_2/S_1$) of the surface area ($S_2$) at the primary side of the filter membrane to the apparent external surface area ($S_1$) of the filter element was 9.9.

Using this apparatus, the filtration of about 90 hours was conducted. When the pressure difference before and behind the filter became 950 mm $H_2O$, the filter element was taken out. A pipe of 25A (the outside diameter of 34 mm and the inside diameter of 28.4 mm) having open ends was equipped to the inside of the cylindrical filter element (secondary side air chamber), the primary side of the pipe was in an open air state, and the pipe was disposed such that a back washing and regenerating gas was jetted to the axial direction of the cylindrical filter element. The jet nozzle was connected to a head tank having an inside volume of 30 liters via a pipe of 25A and an electromagnetic valve, and the jetting of a back washing gas was conducted several times at a pulse jet interval of 0.5 second for a jetting time per one pulse of 0.13 second. When the jetted amount of the back washing and regenerating gas per one pulse in the back washing and the regeneration was obtained from the amount of the pressure decrease in the head tank and the volume of the head tank, the amount was 75 liters. Thus, the back washing and the regeneration were conducted at a value of volume of gas per one pulse divided by the jetting time and the filtration area to be jetted of 0.24 m$^3$/m$^2$·sec. However, the blowing down of silica fine powder was insufficient, only a part of the filter membrane of the filter element was exposed, and the silica fine powder entered the spaces of the pleat could not be removed.

COMPARATIVE EXAMPLE 4

After conducting the same filtration as in Example 1 using the apparatus as shown in Example 1, the four filter elements having attached thereto silica fine powder were taken out. Two jet nozzles for back washing each made up of a pipe of 20A (the outside diameter of 27.2 mm and the inside diameter of 23 mm), both ends of which being closed, having two jet orifices having a diameter of 8 mm were prepared for one of the four filter elements and disposed such that a gas was jetted to the axial direction of each air chamber. Each jet nozzle was connected to a head tank having an inside volume of 30 liters and a pressure of 6 kg/cm$_2$ from the side of the jet nozzle via a pipe of 20 A and an electromagnetic valve. When the primary side was in an open air state and a back washing and regenerating test was conducted at a pulse of 0.2 second, the release of silica was good, but it became clear that the filter element was largely distorted during gas jetting and a problem occurred in the durability of the filter element. In this case, the jetted amount of the back washing gas per one pulse obtained from the product of the amount of the pressure decrease in the head tank and the volume of the head tank was 7.5 liters per one jet orifice. That is, the value of volume of gas per one pulse divided by the jetting time and the filtration area to be jetted was 0.35 m$^3$/m$^2$·sec.

As described above, the present invention makes it possible to stably remove silica fine powder having a high attaching property contained in a gas discharged from a single wafer processing CVD apparatus without giving a pressure fluctuation to the CVD apparatus and without causing problems such as an increase of pressure loss in the filters.

While the invention has been described in detail and with reference to specific embodiments thereof, it will be apparent to one skilled in the art that various changes and modifications can be made therein without departing from the spirit and scope thereof.

What is claimed is:

1. A dust removing method for removing fine powder contained in an exhaust gas discharged from a semiconductor production step using a single wafer processing atmospheric pressure CVD apparatus, which comprises continuously carrying out a filtration using filters each equipped with a filter element wherein a ratio ($S_2/S_1$) of a surface area ($S_2$) at a primary side of a filter membrane to an apparent external surface area ($S_1$) of said filter element is from 1 to 5, and said filters are also each equipped with a pulse jet mechanism for a gas for back washing disposed in an air chamber at a secondary side of said filter element, without carrying out back washing until processing of a wafer fed in the CVD apparatus is completed, and carrying out back washing after completion of the processing of the wafer, wherein a jetting amount of the gas for said back washing is such that a value of a volume of gas per one pulse divided by a jetting time and an area of the filter membrane at a portion to be jetted is from 0.03 to 0.3 m$^3$/m$^2$·sec.

2. The dust removing method of claim 1, wherein the filters are two or more lines of filters formed in parallel per one line of the single wafer processing atmospheric pressure CVD apparatus via change-over valves, and while the filtration is carried out in one line of the filters, in another line of the filters the gas for the back washing is jetted and the exhaust gas from said filters flows to another line or to downstream of the blower.

3. The dust removing method of claim 1, wherein a cleaning column for removing a silane series gas is connected to an outlet side of each filter so as to receive filtered gas from each filter.

4. A dust removing apparatus for removing fine powder contained in an exhaust gas discharged from a semiconductor production step using a single wafer processing atmospheric pressure CVD apparatus, said dust removing apparatus comprising filters each equipped with a filter element and a pulse jet nozzle of a gas for back washing disposed at a secondary side of the filter element, a gas suction blower, and a gas tank connected to each pulse jet nozzle, wherein a ratio ($S_2/S_1$) of a surface area ($S_2$) at a primary side of a filter membrane to an apparent external surface area ($S_1$) of said filter element is from 1 to 5, and a gas jetting amount for back washing is such that a value of a volume of gas per one pulse divided by a jetting time and an area of the filter membrane of a portion to be jetted is from 0.03 to 0.3 m$^3$/m$^2$·sec.

5. The dust removing apparatus of claim 4, wherein the filters are two or more lines of filters formed in parallel per one line of the single wafer processing atmospheric pressure CVD apparatus via change-over valves, and said dust removing apparatus is constituted in such a manner that while the filtration is conducted in one line of the filters, in another line of the filters the gas for the back washing is jetted and the exhaust gas from said filters flows to another line or to downstream of the blower.

6. The dust removing apparatus of claim 4, wherein a cleaning column for removing a silane series gas is connected to an outlet side of each filter so as to receive filtered gas from each filter.

* * * * *